United States Patent
Danilov et al.

(10) Patent No.: US 10,684,780 B1
(45) Date of Patent: Jun. 16, 2020

(54) TIME SENSITIVE DATA CONVOLUTION AND DE-CONVOLUTION

(71) Applicant: EMC IP Holding Company LLC, Hopkinton, MA (US)

(72) Inventors: Mikhail Danilov, Saint Petersburg (RU); Alexander Rakulenko, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/662,273

(22) Filed: Jul. 27, 2017

(51) Int. Cl.
G06F 3/06 (2006.01)

(52) U.S. Cl.
CPC ........... *G06F 3/0616* (2013.01); *G06F 3/064* (2013.01); *G06F 3/067* (2013.01); *G06F 3/0653* (2013.01)

(58) Field of Classification Search
CPC ...... G06F 3/0616; G06F 3/064; G06F 3/0653; G06F 3/067
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 7,389,393 B1 | 6/2008 | Karr et al. | |
| 8,370,542 B2 | 2/2013 | Lu et al. | |
| 8,495,465 B1 | 7/2013 | Anholt et al. | |
| 8,832,234 B1 * | 9/2014 | Brooker | G06F 16/182 709/219 |
| 8,972,478 B1 | 3/2015 | Storer et al. | |
| 9,063,838 B1 | 6/2015 | Boyle et al. | |
| 9,641,615 B1 | 5/2017 | Robins et al. | |
| 10,055,145 B1 | 8/2018 | Danilov et al. | |
| 10,361,810 B2 | 7/2019 | Myung et al. | |
| 10,503,611 B1 | 12/2019 | Srivastav et al. | |
| 2002/0166026 A1 | 11/2002 | Ulrich et al. | |
| 2005/0140529 A1 | 6/2005 | Choi et al. | |
| 2006/0047896 A1 | 3/2006 | Nguyen et al. | |
| 2006/0075007 A1 * | 4/2006 | Anderson | G06F 3/0608 |
| 2006/0143508 A1 | 6/2006 | Mochizuki et al. | |

(Continued)

OTHER PUBLICATIONS

Non-Final Office Action received for U.S. Appl. No. 15/651,504 dated Mar. 21, 2019, 10 pages.

(Continued)

*Primary Examiner* — Tuan V Thai
*Assistant Examiner* — Alexander J Yoon
(74) *Attorney, Agent, or Firm* — Amin, Turocy & Watson, LLP

(57) ABSTRACT

Time sensitive data convolution and de-convolution is disclosed. Data stored in chunks of memory can be convolved, based on temporal aspects of the data stored on the chunks, to conserve used memory. Convolved chunks can be de-convolved according to several schema, wherein the schema are selected based temporal aspects of the original data blocks being determined to have satisfied one or more rule(s). In an aspect, the schema can reduce an amount of data transfer between data storage devices of different zones in regard to convolving or de-convolving data blocks. In an embodiment the convolution can comprise an 'exclusive or' operation of a first chunk and second chunk to form a third chunk, wherein the several chunks are stored in different zones.

20 Claims, 11 Drawing Sheets

(56) References Cited

U.S. PATENT DOCUMENTS

| | | |
|---|---|---|
| 2007/0239759 A1 | 10/2007 | Shen et al. |
| 2008/0320061 A1* | 12/2008 | Aszmann .............. G06F 3/0676 |
| 2009/0259882 A1 | 10/2009 | Shellhamer |
| 2010/0031060 A1 | 2/2010 | Chew et al. |
| 2010/0332748 A1 | 12/2010 | Van der Goot et al. |
| 2011/0138148 A1 | 6/2011 | Friedman et al. |
| 2011/0246503 A1 | 10/2011 | Bender et al. |
| 2012/0023291 A1 | 1/2012 | Zeng et al. |
| 2012/0204077 A1 | 8/2012 | D'Abreu et al. |
| 2012/0317234 A1* | 12/2012 | Bohrer .................... H04W 4/00 709/219 |
| 2013/0054822 A1 | 2/2013 | Mordani et al. |
| 2013/0088501 A1* | 4/2013 | Fell ....................... G06F 12/023 345/543 |
| 2013/0097470 A1 | 4/2013 | Hwang et al. |
| 2013/0246876 A1 | 9/2013 | Manssour et al. |
| 2014/0064048 A1 | 3/2014 | Cohen et al. |
| 2014/0280375 A1 | 9/2014 | Rawson et al. |
| 2014/0380088 A1 | 12/2014 | Bennett et al. |
| 2014/0380125 A1 | 12/2014 | Calder et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0380650 A1 | 12/2016 | Calder et al. |
| 2017/0003880 A1* | 1/2017 | Fisher .................... G06F 3/061 |
| 2017/0102993 A1 | 4/2017 | Hu et al. |
| 2017/0206135 A1 | 7/2017 | Zeng |
| 2017/0262187 A1 | 9/2017 | Manzanares et al. |
| 2018/0063213 A1 | 3/2018 | Bevilacqua-Linn et al. |
| 2018/0129417 A1 | 5/2018 | Sivasubramanian et al. |
| 2018/0181324 A1 | 6/2018 | Daniliv et al. |
| 2018/0181612 A1 | 6/2018 | Daniliv et al. |
| 2018/0267856 A1 | 9/2018 | Hayasaka et al. |
| 2018/0341662 A1 | 11/2018 | He |
| 2019/0028179 A1 | 1/2019 | Kalhan |
| 2019/0065310 A1 | 2/2019 | Rozas |
| 2019/0205437 A1 | 7/2019 | Larson et al. |
| 2019/0384500 A1 | 12/2019 | Danilov et al. |
| 2019/0386683 A1 | 12/2019 | Danilov et al. |

OTHER PUBLICATIONS

Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wildpedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm Blob Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance dated May 4, 2020 for U.S. Appl. No. 16/240,193, 46 pages.

* cited by examiner

TIME SENSITIVE DATA CONVOLUTION AND DE-CONVOLUTION

TECHNICAL FIELD

The disclosed subject matter relates to time sensitive data convolution and deconvolution, and, more particularly, to creating or destroying convolved data blocks relative to temporal aspects associated with source data blocks contributing to the convolved data blocks.

BACKGROUND

Conventional data storage techniques can employ convolution and deconvolution to conserve storage space. As an example, convolution can allow data, to be packed or hashed in a manner that uses less space that the original data. Moreover, the convolved data can typically be de-convolved to the original data. One such use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space in to blocks of fixed size, frequently referred to as chunks, for example a 128 MB chunk, etc. Chunks can be used to store user data, and the chunks can be shared among the same or different users, for example, one chunk may contain fragments of several user objects. A chunk's content can be modified in an append-only mode to prevent overwriting of data already added to the chunk. As such, when a typical chunk becomes full enough, it can be sealed so that the data therein is generally not able to be further modified. Accordingly, as user objects are updated, the updated user objects can be appended into another chunk. Eventually the earlier chunk can comprise only data that is stale. Storing stale data can be undesirable and the chunk can be reclaimed by a disk space management technology.

Some networked storage technologies are geographically distributed to enable storing chunks at different geographical locations. This can be beneficial in that data compromised at one location can be backed up by redundant data in another location. Chunks can be convolved to reduce the amount of disk space used by copies of data at geographically distinct locations. Convolution and de-convolution of chunks in different geographical locations can entail transferring data across a network, which transfer can be associated with time costs, monetary costs, etc.

DETAILED DESCRIPTION

Figure 1:
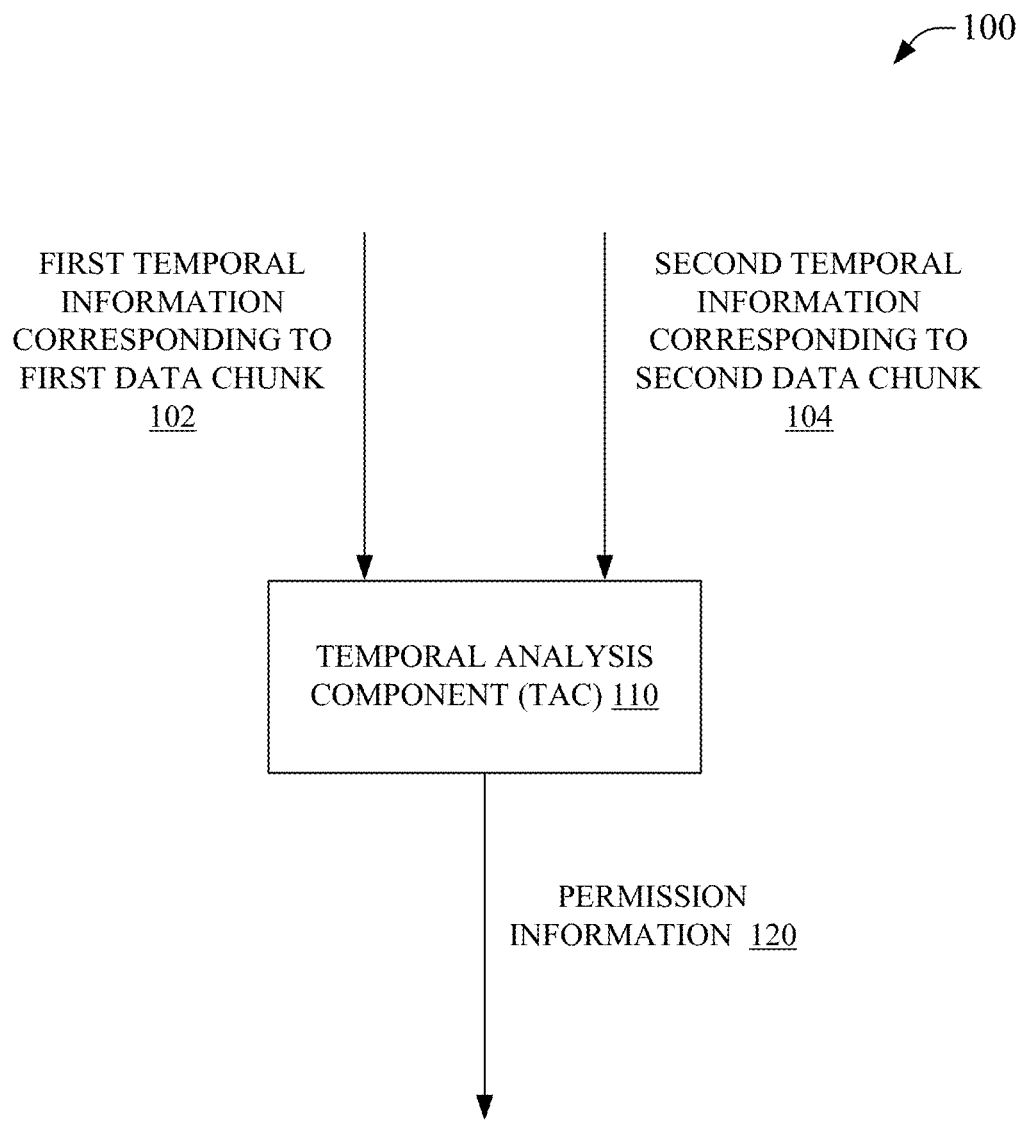
FIG. 1 is an illustration of an example system that can facilitate temporal analysis of data to determine a permission related to convolving or de-convolving data, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. Data chunks, e.g., chunks, etc., can be used to store user data, and the chunks can be shared among the same or different users. A typical chunk can contain fragments of different user objects. Chunk contents can be modified, for example, in an append-only mode to prevent overwriting of data already added to the chunk. As such, when a typical append-only chunk is determined to be full, the data therein is generally not able to be further modified. Eventually the chunk age and the data stored therein can become stale. Storing stale data can be undesirable.

Further, data storage can be performed in a geographically distributed manner to enable storing chunks at different geographical locations. This can be beneficial in that data compromised at one location can be backed up by redundant data in another location. Chunks from disparate locations can be convolved at a still further location to both reduce the amount of disk space used for redundant storage and provide geographic distribution of the redundant data chunks to provide further security, storage reliability, storage durability, etc. Convolution and de-convolution of chunks in different geographical locations can entail transferring data across a network, which transfer can be associated with time costs, monetary costs, etc. As such, it can be desirable to reduce data transfer, for example, as disclosed herein via analysis of temporal information associated with the data stored in the chunks. Of note, the term 'disk space,' as used herein, means any rewritable data storage technologies, e.g., physical disk drive space, solid state memory space, etc., and all such rewritable data storage technologies are within the scope of the present disclosure even where not explicitly recited for the sake of clarity and brevity.

At a general level, the presently disclosed subject matter can be described in terms of zones, wherein a zone corresponds to a geographic location or region. As such, different zones can be associated with different geographic locations or regions. As an example, Zone A can be located in Seattle, Wash., Zone B can be located in Dallas, Tex., and, Zone C can be located in Boston, Mass. In this example, where a chunk from Zone A is replicated in Zone C, an earthquake in Seattle is less likely to damage the replicated data in Boston. Moreover, a chunk from Dallas can be convolved with the Seattle chunk in the example and the resulting convolved chunk can be stored in Boston. As such, either the chunk from Seattle or Dallas can be used to de-convolve the chunk stored in Boston to recover the full set of both the Seattle and Dallas data chunks. The convolved Boston chunk can consume less disk space than the sum of the Seattle and Dallas chunks. An example technique can be "exclusive or" convolution, hereinafter 'XOR', '$\oplus$', etc., where the data in the Seattle and Dallas chunks are convolved by XOR processes to form the Boston chunk, e.g., $C=A1 \oplus B1$, where A1 is a replica of the Seattle chunk, B1 is a replica of the Dallas chunk, and C is the convolution of A1 and B1. The particulars of this particular convolution technique or other applicable convolution techniques is beyond the scope of the present disclosure, although all such convolution and corollary de-convolution technologies are considered within the scope of the present disclosure even where not explicitly recited for the sake of clarity and brevity. Of further note, the disclosed subject matter can further be employed in more or fewer zones, in zones that are the same or different than other zones, etc. As an example, the disclosed subject matter can be applied on a data of a single disk, memory, drive, data storage device, etc., without departing from the scope of the disclosure. Moreover, it will be noted that convolved chunks can be further convolved with other data, e.g., $D=C1 \oplus E1$, etc., where E1 is a replica of, for example, a Miami chunk, E, C1 is a replica of the Boston chunk, C, from the previous example and D is an XOR of C1 and E1 located at, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1, the Miami chunk, C, can be de-convolved into A1 or B1 based on either A1 or B1, etc. Where convolving data into C or D comprises deletion of the replicas that were convolved, e.g., A1 and B1, or C1 and E1, respectively, to avoid storing the input replicas and the convolved chunk, de-convolution can rely on retransmitting a replica that can be employed in de-convoluting the convolved chunk. As an example the Seattle chunk and Dallas chunk can be replicated in the Boston zone. The replicas, A1 and B1 can then be convolved into C. Replicas A1 and B1 can then be deleted because their information is embodied in C, albeit convolved, e.g., via an XOR process, etc. This leaves only chunk C at Boston as the backup to Seattle and Dallas. If either Seattle or Dallas is to be recovered, the corresponding input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved. It can be desirable to reduce data transfers because they are typically associated with costs in equipment, time, personnel, real monetary costs, etc.

Disk space management can be premised on temporal aspects of the data stored in the chunks. Where data becomes stale, e.g., a client does not want to pay for further storage of data, data has become old, data is irrelevant in view of newer data, etc., the data can be associated with a 'data lifetime,' e.g., stale data has expended the lifetime of the data. Stale data can then be marked for deletion, e.g., the disk space used for the stale data and replicas or convolutions thereof, etc., can be used for other data, be overwritten, etc. The disclosed subject matter discloses temporal analysis in creating convolved chunks to alter the amount of data that is transferred in disk space management, e.g., where a first chunk and a second chunk go stale at the same time, convolving the first and second chunk can allow deletion of the first chunk, second chunk, and convolved chunk without transferring a replica of the first or second chunk to allow for de-convolution of the convolved chunk because the second chunk does not need to be recovered where it is being deleted at the same time as the first chunk. This example, therefore, reduces data transfer by convolving chunks having the same temporal feature, e.g., the same data lifetime information.

Chunks can also be convolved where the temporal features are similar, e.g., where the data lifetimes are similar. As an example, where a first chunk has a one year lifetime and a second chunk has a one year and one day lifetime, convoluting the first and second chunk can be beneficial to reducing data transfer. In an aspect, where the first chunk becomes stale after one year, it can be retained for an additional day to allow the second chunk to expire. Once the first and second chunks have expired after a year and a day, then the first chunk, second chunk, and convolved chunk can be deleted with reduced data transfer. In another aspect, where the first chunk becomes stale after one year, it and the convolved chunk can be deleted without de-convolving the convolved chunk where it is determined that the risk to loss of data for the second chunk is acceptable for the additional day of lifetime associated with the second chunk. Then, when the second chunk expires the following day, the second chunk can be deleted. In this aspect, the second chunk exists for a day without a replica and without a convolved chunk. It will be noted that these aspects can be less desirable where there are greater temporal differences between the first and second chunks, e.g., where the first chunk has a lifetime of one year and the second chunk has a lifetime of two years, then the first chunk is retained for an extra year or the second chunk exists without a replica for a year to achieve the same reduction of data transfer as noted above. However, where the lifetimes are sufficiently different, data can be transferred to enable de-convolution and recovery of the disk space allocated to the earlier expiring chunk. Temporal analysis can therefore employ rules that allow for designation or selection of temporal factors, e.g., the difference in the lifetimes of a first and second chunk can be selected by, or designated by, a user, company, entity, etc. As an example, a one day difference in lifetime can be designated as acceptable for keeping stale first data until the second data goes stale. As a further example, a customer service level can be associated with how long a second data can be without a replica where a first data expires before the second data and is deleted along with the convolved data, e.g., a premier level customer can have zero days without a replica, a standard level customer can have one day without a replica, and a bargain level customer can have three days without a replica, etc. As a yet further example, the temporal analysis can be based on historical risk associated with the relevant data chunks, e.g., where a second chunk is in a zone that historically has higher than average failure rates, the days without a replica can be lower than for a zone that historically has a lower than average failure rate such that where data is more likely to be lost, the time without a replica is correspondingly lower. In another example, the temporal analysis can depend on the value of recovering the stale disk space, e.g., where there is already excess storage, stale data can be retained longer and therefore the difference between the lifetime of the first and second chunks can be greater than where disk space is more limited and hence more valuable. As will be appreciated, numerous rules can be applied to the temporal analysis, e.g., risk factor analysis, service agreements, need to recover underutilized disk space, etc., and all such rules or factors are considered within the scope of the instant disclosure even where not explicitly recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate temporal analysis of data to determine a permission related to convolving or de-convolving data, in accordance with aspects of the subject disclosure. System 100 can comprise temporal analysis component (TAC) 110. TAC 110 can receive first temporal information corresponding to a first data chunk 102. TAC 110 can further receive second temporal information corresponding to a second data chunk 104. TAC 110 can generate permission information 120 based on the analysis of the first and second temporal information, e.g., 102 and 104.

In an aspect, first temporal information corresponding to a first data chunk 102 can comprise expected lifetime information for the first data chunk. Similarly, second temporal information corresponding to a second data chunk 104 can comprise second expected lifetime information for the second data chunk. In an embodiment, TAC 110 can determine a difference between the first and second temporal information, e.g., 102 and 104, which can be a difference in the expected lifetimes. The difference can be employed in determining if a rule related to a threshold temporal value has been satisfied. In an embodiment, where the rule is determine to have been satisfied, a permission can be generated, e.g., permission information 120. Where an example rule is determined to be satisfied by the difference between the first and second temporal information, e.g., 102 and 104, being below a threshold value, permission information 120 can be employed to enable convolution of the first and second chunks. In some embodiments, convolution of the first and second chunks can be via local convolution of replicas of the first and second chunks. In an aspect, where the rule is not satisfied, permission can be withheld. In some embodiments, the lack of permission can be dispositive to convolution of the first and second chunks, e.g., in some embodiments, without the permission the chunks will not be convolved. In some embodiments, the lack of permission can be a factor in facilitating a convolution of the chunks, e.g., the lack of permission from TAC 110 can be considered or employed in further determinations related to convolving the first and second chunk but may not entirely prevent the convolution. As an example, where the temporal analysis does not satisfy the rule and permission is withheld, the first and second chunk may still be convolved where it is otherwise determined that they should be convolved despite failing to satisfy the temporal rule, such as where a customer explicitly pays for the data to be convolved regardless of data lifetime information, etc.

TAC 120 can be embodied in a data store component. As an example, a data center for a zone can comprise a first TAC 120, a data center for another zone can comprise a second TAC 120, etc. As such, in the example, data chunks submitted to the several zones can be temporally analyzed by the TAC 120 of the data center for each receiving zone. In some embodiments, TAC 120 can be embodied in a component located remotely from one or more data stores. As an example, TAC 120 can be located on a corporate server to temporally analyze chunks that are candidates for convolution. In an aspect, this can allow chunks to be analyzed prior to creating replicas on data stores of other zones, thereby reducing data transfer by not replicating chunks that do not satisfy temporal analysis rule(s).

In some embodiments, TAC 110 can sort chunks that are candidates for convolution. As such, where more than two candidate chunks are available for analysis, the candidate chunks can be sorted, ranked, ordered, etc., to enable convolution of chunks that are determined to satisfy temporal analysis rule(s). As an example, where three chunks are candidates for convolution, the first chunk can expire in P days, the second chunk can expire in a P+2 days, and the third chunk can expire in P+1 days. TAC 110 can order the chunks, e.g., 1st, 3rd, 2nd, etc., such that the two candidate chunks that have the closest expirations are convolved where they still satisfy the temporal rule(s). As a further example, where the 1st chunk expires in P days, the second chunk in P+35 days, and the 3rd expires in P+36 days, TAC 110 can sort the chunks as 2nd, 3rd, 1st, to allow the second and 3rd chunks to be convolved where they are close in lifetime but that the 1st chunk is not associated with a permission because the temporal features are sufficiently different from the 2nd and 3rd chunk to not satisfy the temporal analysis rule. As another example, where the 1st chunk expires in P days, the second chunk in P+35 days, and the 3rd expires in P+90 days, TAC 110 can sort the chunks as 1st, 2nd, and 3rd, but can not generate a permission where the temporal features of the three chunks are sufficiently different to not satisfy the temporal analysis rule. Numerous other examples can be presented illustrating the sorting aspect of TAC 110, and all such examples are considered within the scope of the present disclosure even where they are not explicitly recited for the sake of clarity and brevity. It will be noted that different embodiments of the disclosed subject matter are not to be considered mutually exclusive and different embodiments can be combined into a further embodiment, unless explicitly indicated otherwise or otherwise implicitly departing from the scope of the present disclosure.

Figure 2:
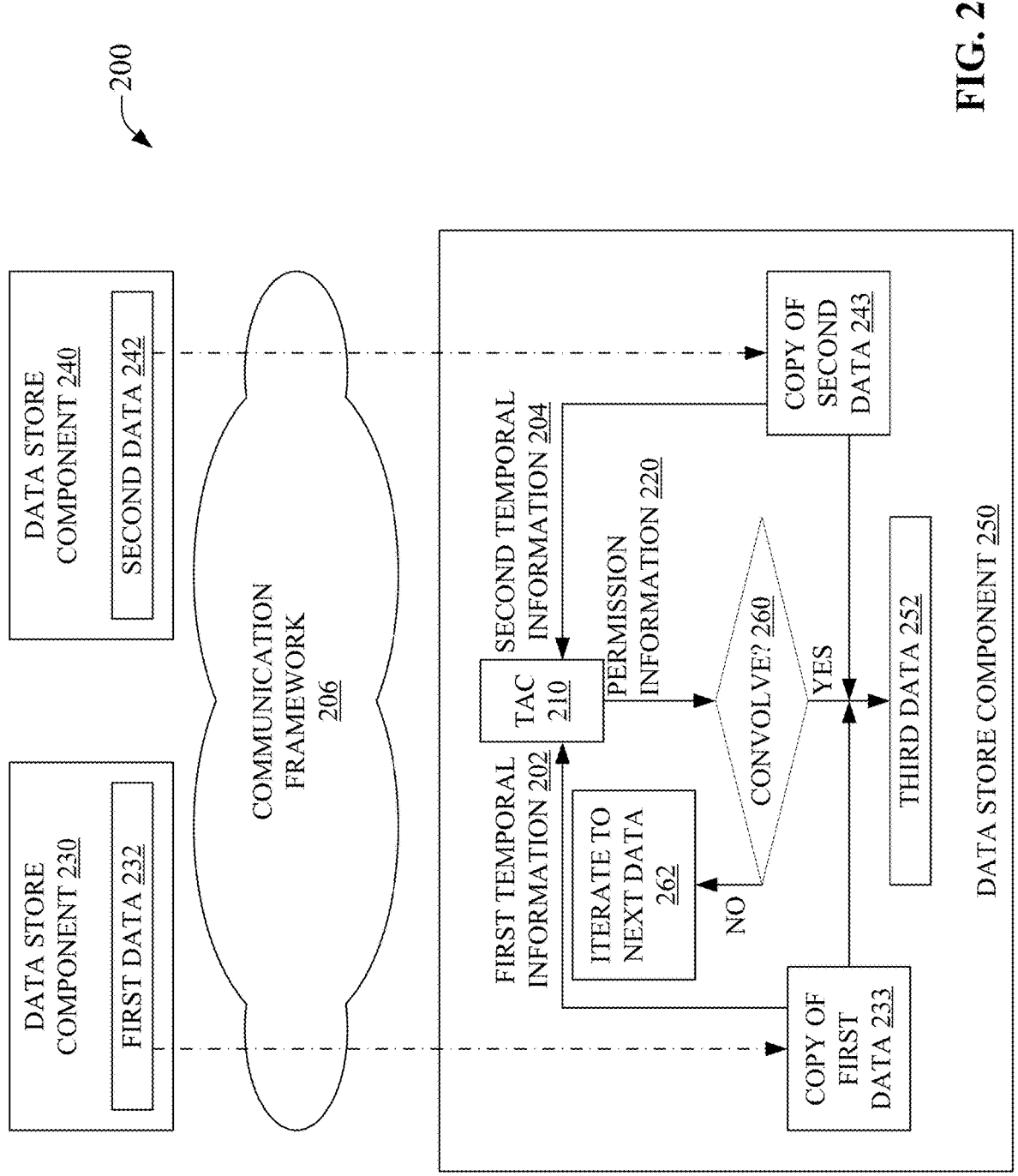
FIG. 2 is an illustration of an example system that can facilitate temporal analysis of two input chunks to determine a permission related to convolving them into a third chunk, in accordance with aspects of the subject disclosure.

FIG. 2 is an illustration of a system 200, which can enable temporal analysis of two input chunks to determine a permission related to convolving them into a third chunk, in accordance with aspects of the subject disclosure. System 200 can comprise data store components 230, 240, and 250 that can be connected via communication framework 206. In an embodiment, communication framework 206 can comprise a wireless network link or a wired network link. As such, communication framework 206 can communicate data between data store components, e.g., 230, 240, 250, etc.

Data store component 230 can comprise first data 232, e.g., a first chunk. Similarly, data store component 240 can comprise second data 242, e.g., a second chunk. First data 232 and second data 242 can be candidates for convolution on data store component 250. Copies of first data 232 and second data 242 can be created on data store component 250, e.g., copy of first data 233 and copy of second data 243. First temporal information 202, corresponding to copy of first data 233, and second temporal information 204, corresponding to copy of second data 243, can be received by TAC 210 comprised in data store component 250.

TAC 210 can, in response to analysis of first temporal information 202 and second temporal information 204, generate permission information 220. Permission information 220 can comprise a permission where the first temporal information 202 and second temporal information 204 satisfy a temporal rule. Similarly, where the temporal rule is not satisfied, permission information 220 can lack the permission. As an example, where first temporal information 202 and second temporal information 204 have lifetimes that are sufficiently similar, e.g., the temporal rule is satisfied when a difference between the first temporal information 202 and second temporal information 204 is within a selectable or designated threshold range, a permission can be generated. The permission can be communicated, via permission information 220, to facilitate determining, at 260, if the chunks will be convolved. Where it is determined at 260 that the chunks will be convolved, e.g., based at least in part on permission information 220, copy of first data 233 and copy of second data 243 can be convolved, e.g., XORed, etc., resulting in third data 252. It will be noted that copy of first data 233, copy of second data 243, and third data 252 then all use disk space. Accordingly, disk space used for copy of first data 233 and copy of second data 243 can then be reclaimed because their data is represented in third data 252 via the convolution. Generally, third data 252 can occupy less disk space that was used by copy of first data 233 and copy of second data 243. Where the convolution does not occur at 260, TAC 210 can iterate to next data 262, e.g., TAC 210 can consider convolving other data chunks from other data store components.

Figure 3:
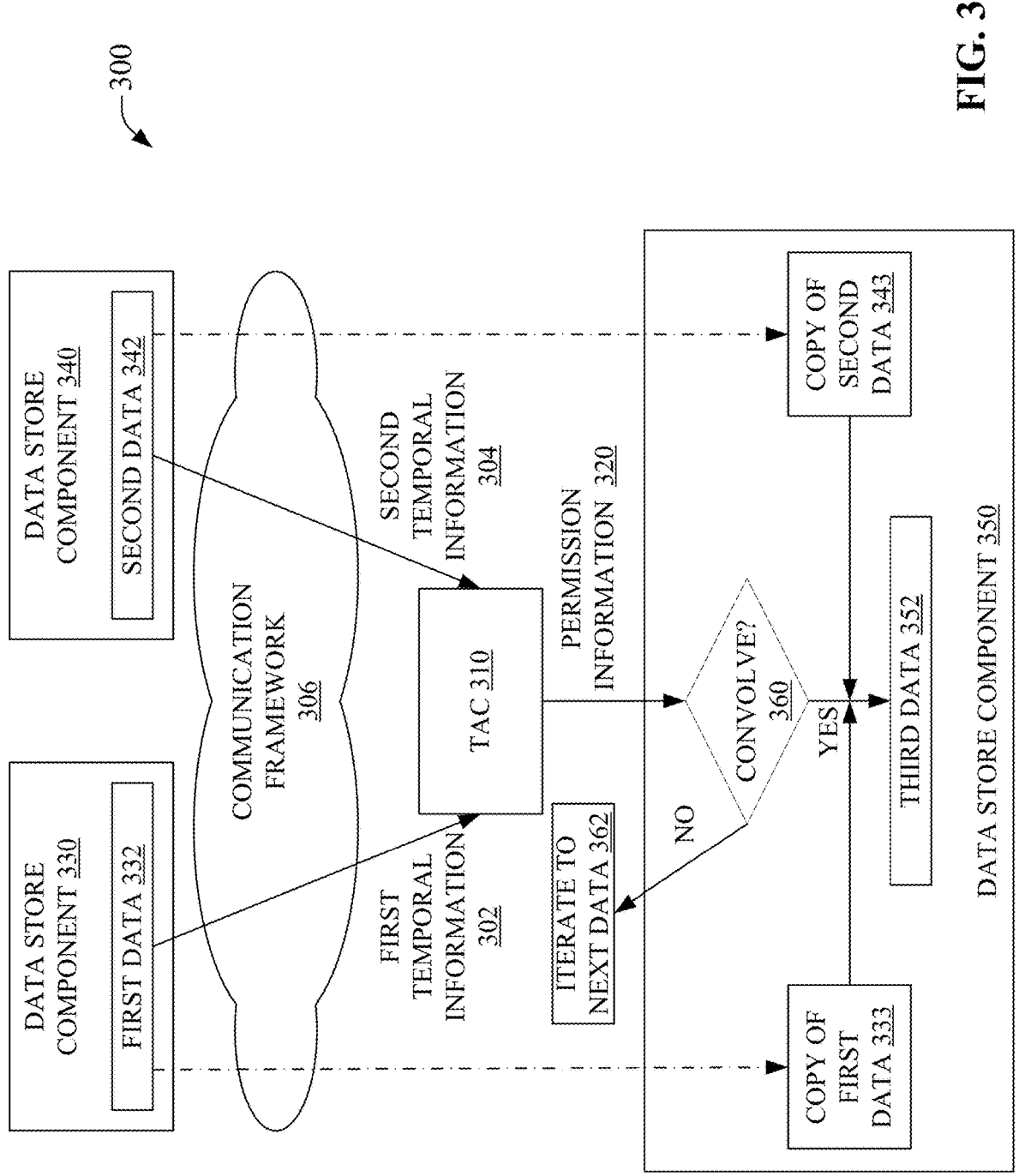
FIG. 3 is an illustration of an example system that can enable temporal analysis of two input chunks to determine copying the input chunks and a permission related to convolving them into a third chunk, in accordance with aspects of the subject disclosure.

FIG. 3 is an illustration of a system 300, which can facilitate temporal analysis of two input chunks to determine copying the input chunks and a permission related to convolving them into a third chunk, in accordance with aspects of the subject disclosure. System 300 can comprise data store components 330, 340, and 350 that can be connected via communication framework 306. In an embodiment, communication framework 306 can comprise a wireless network link or a wired network link. As such, communication framework 306 can communicate data between data store components, e.g., 330, 340, 350, etc. Further, communication framework 306 can communicate data between TAC 310 and other components of system 300, e.g., between data store component 350 and TAC 310, data store component 330 and TAC 310, etc.

Data store component 330 can comprise first data 332, e.g., a first chunk. Similarly, data store component 340 can comprise second data 342, e.g., a second chunk. First data 332 and second data 342 can be candidates for convolution on data store component 350. Prior to copies of first data 332 and second data 342 being created on data store component 350, e.g., as copy of first data 333 and as copy of second data 343, first temporal information 302, corresponding to first data 332, and second temporal information 304, corresponding to second data 342, can be received by TAC 310. In an embodiment TAC 310 can be located separately from data store component 350, e.g., as a discrete component that is not part of data store component 350, located remotely from data store component 350, as a virtualized component on one or more networked computing devices wherein the virtualized TAC 310 is distinct from data store component 350, etc.

TAC 310 can, in response to analysis of first temporal information 302 and second temporal information 304, generate permission information 320. Permission information 320 can comprise a permission where the first temporal information 302 and second temporal information 304 satisfy a temporal rule. Similarly, where the temporal rule is not satisfied, permission information 320 can lack the permission. As an example, where first temporal information 302 and second temporal information 304 have lifetimes that are sufficiently similar, e.g., the temporal rule is satisfied when a difference between the first temporal information 302 and second temporal information 304 is within a selectable or designated threshold range, a permission can be generated. The permission can be communicated, via permission information 320, to facilitate determining, at 360, if the chunks will be convolved. Where it is determined at 360 that the chunks will be convolved, e.g., based at least in part on permission information 320, copy of first data 333 and copy of second data 343 can be created as replicas of first data 332 and second data 342. Copy of first data 333 and copy of second data 343 can then be convolved, resulting in third data 352. Disk space used for copy of first data 333 and copy of second data 343 can then be reclaimed because their data is redundant with third data 352 after convolution. Where the convolution does not occur at 360, TAC 310 can iterate to next data 362 without ever creating copy of first data 333 and copy of second data 343, e.g., TAC 310 can avoid copying candidate chunks over communication framework 306 where they will not be convolved. In some embodiments, decision block 360 can be comprised in data store component 350 as illustrated, e.g., where permission information 320 is only one factor considered in determining convolution. In some embodiments, block 360 can be comprised other than in data store component 350, e.g., block 360 can be comprised in TAC 310, not illustrated, as a separate component, not illustrated, etc. In these embodiments, block 360 can facilitate enabling the copying of first and second data, e.g., 332 and 342 into 333 and 343 respectively, to facilitate convolution into third data 352.

Figure 4:
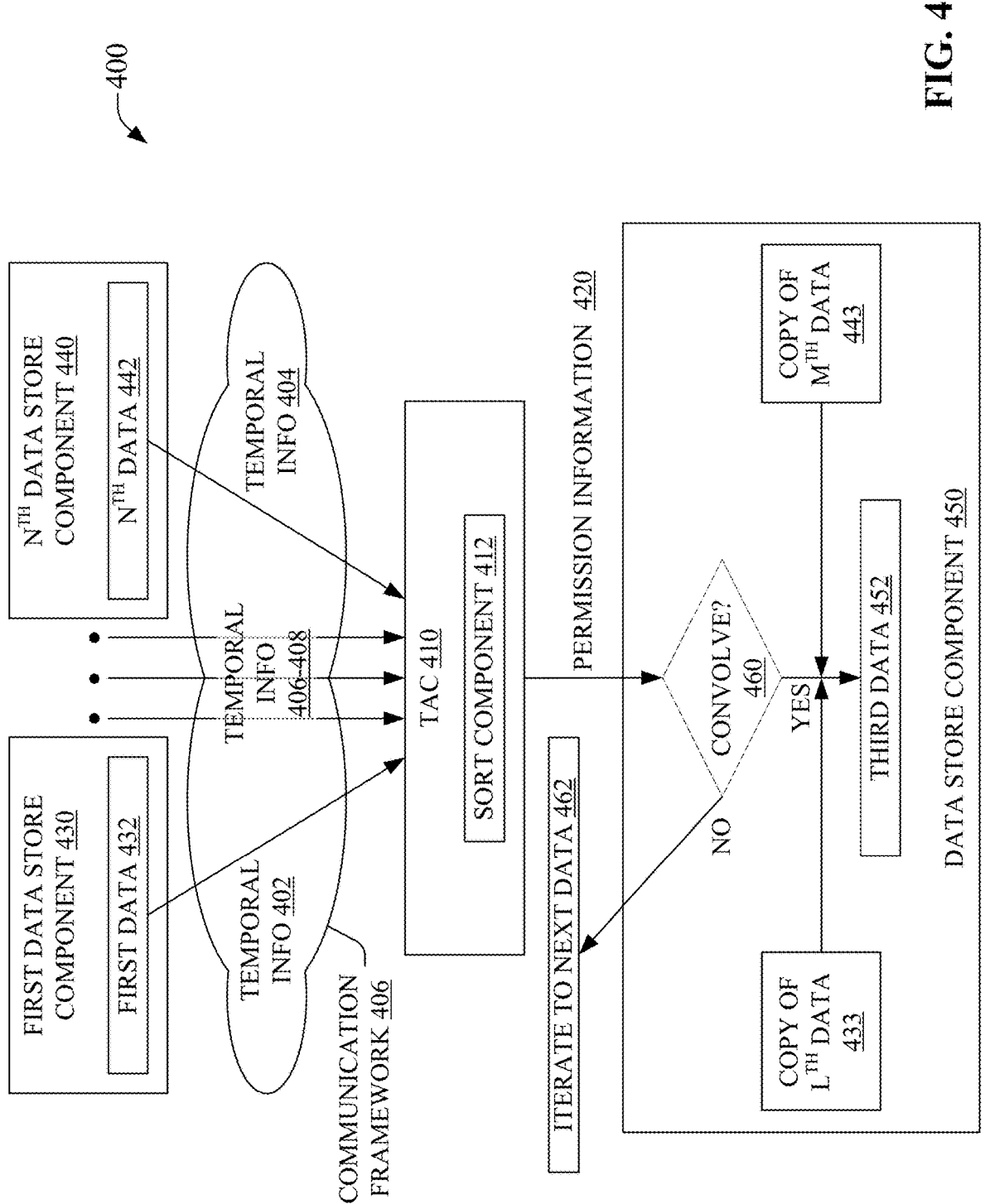
FIG. 4 illustrates an example system that can facilitate temporal analysis of multiple input chunks to determine a sorting of the input chunks and a permission related to convolving selected chunks into a third chunk, in accordance with aspects of the subject disclosure.

FIG. 4 is an illustration of a system 400, which can enable temporal analysis of multiple input chunks to determine a sorting of the input chunks and a permission related to convolving selected chunks into a third chunk, in accordance with aspects of the subject disclosure. System 400 can comprise first data store component 430 through $N^{th}$ data store component 440, and data store component 450 that can be connected via communication framework 406 to other components of system 400. In an embodiment, communication framework 406 can comprise a wireless network link or a wired network link. As such, communication framework 406 can communicate data between data store components, e.g., 430 to 440, 450, etc. Further, communication framework 406 can communicate data between TAC 410 and other components of system 400, e.g., between data store component 450 and TAC 410, data store component 430 and TAC 410, etc.

Data store component 430 can comprise first data 432, e.g., a first chunk. Similarly, data store component 440 can comprise second data 442, e.g., a second chunk. First data 432 and second data 442 can be candidates for convolution on data store component 450. Prior to copies of first data 432 and second data 442 being created on data store component 450, e.g., as copy of first data 433 and as copy of second data 443, first temporal information 402, corresponding to first data 432, and second temporal information 404, corresponding to second data 442, can be received by TAC 410. In an embodiment TAC 410 can be located separately from data store component 450, e.g., as a discrete component that is not part of data store component 450, located remotely from data store component 450, as a virtualized component on one or more networked computing devices wherein the virtualized TAC 410 is distinct from data store component 450, etc.

TAC 410 can, in response to analysis of temporal information 402, 404, and 406-408, generate permission information 420. Permission information 420 can comprise a permission where temporal information corresponding to a $L^{th}$ and an $M^{th}$ chunk of the 1 to N chunks, e.g., first data 432 to $N^{th}$ data 442, satisfy a temporal rule. Similarly, where the temporal rule is not satisfied, permission information 420 can lack the permission.

In an aspect, TAC 410 can comprise sort component 412. Sort component 412 can enable sorting of chunks based on corresponding temporal data and/or analysis thereof. As an example, where an $L^{th}$ temporal information and an $M^{th}$ temporal information have lifetimes that are sufficiently similar, sort component 412 can place them at similar positions in the sorting of candidate chunks, e.g., chunks that have similar temporal aspects can be denoted to allow those similar chunks to be convolved. In an aspect, the sort can be a ranking, ordering, filtering, etc., of available chunks. As an example, where three chunks are candidates for convolution, first chunk 432 can expire in P days, an $L^{th}$ chunk can expire in a P+20 days, and an $M^{th}$ chunk can expire in P+21 days. Sort component 412 can order the chunks as $L^{th}$, $M^{th}$, and first chunk 432, etc., such that the $L^{th}$ and $M^{th}$ chunks, which have more similar temporal features with each other than with first chunks 432, are sorted such that they are early candidates for convolution where they still satisfy other temporal rule(s). Numerous other examples can be presented illustrating the sorting aspect of sort component 412, and all such examples are considered within the scope of the present disclosure even where they are not explicitly recited for the sake of clarity and brevity.

Permission can be communicated, via permission information 420, to facilitate determining, at 460, if and which candidate chunks can be convolved. Where it is determined at 460 that the a $L^{th}$ and an $M^{th}$ chunks can be convolved, e.g., based at least in part on permission information 420, copy of $L^{th}$ data 433 and copy of $M^{th}$ data 443 can be created as replicas of an $L^{th}$ and an $M^{th}$ data. These copies can then be convolved, resulting in third data 452. Disk space used for the copies can then be reclaimed because their data is redundant with third data 452 after convolution. Where the convolution does not occur at 460, TAC 410 can iterate to next data 462 without ever creating copies of chunks that are not to be convolved. In some embodiments, decision block 460 can be comprised in data store component 450 as illustrated. In some embodiments, block 460 can be comprised other than in data store component 450.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
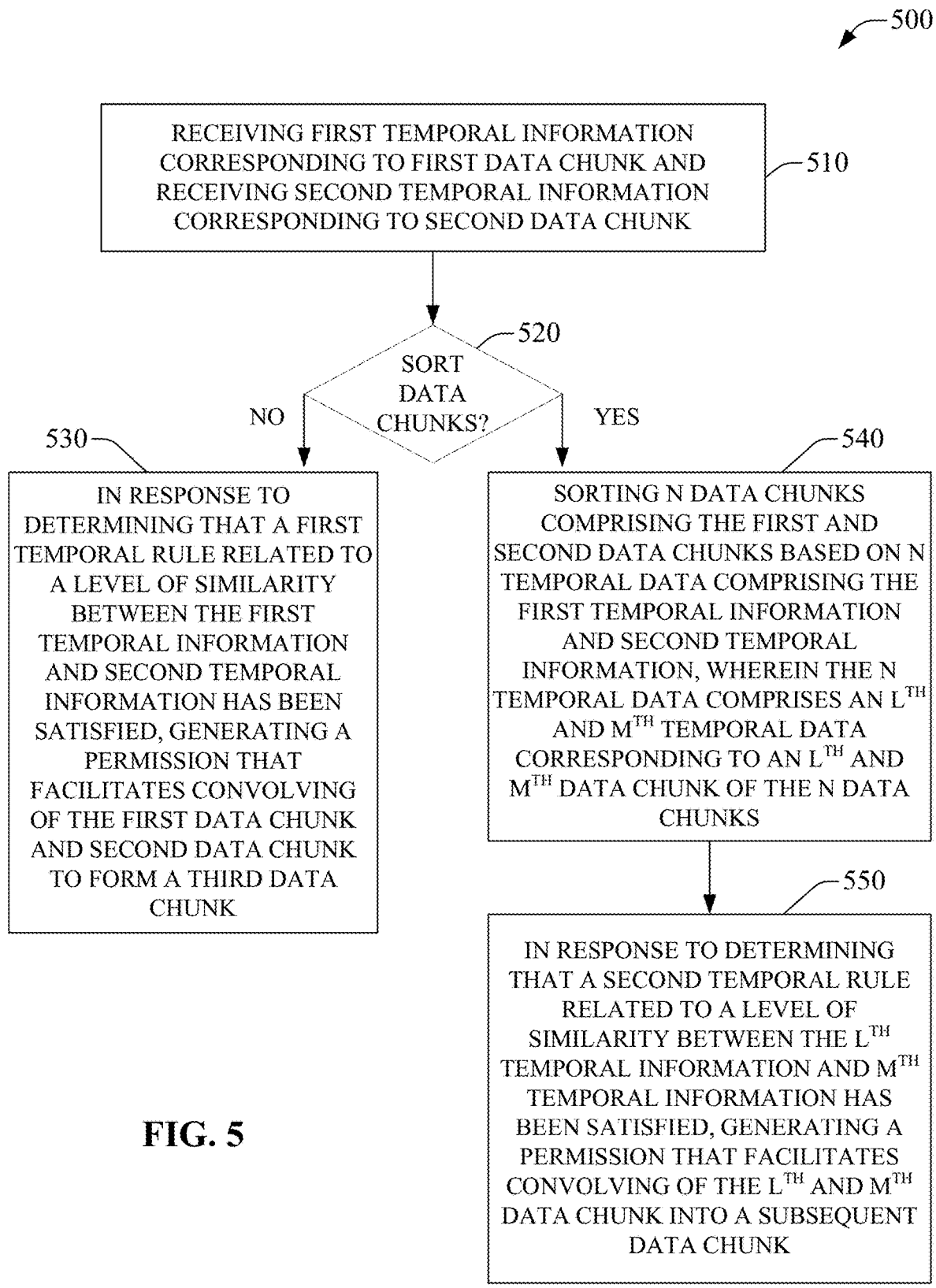
FIG. 5 is an illustration of an example method facilitating temporal analysis of input chunks to determine a permission related to convolving them into another chunk, in accordance with aspects of the subject disclosure.

FIG. 5 is an illustration of an example method 500, which can facilitate temporal analysis of input chunks to determine a permission related to convolving them into another chunk, in accordance with aspects of the subject disclosure. At 510, method 500 can comprise receiving first temporal information corresponding to a first data chunk and receiving second temporal information corresponding to a second data chunk. Temporal information can reflect temporal aspects of data comprised in the corresponding chunk. As an example, where data is determined to go stale at a particular date, this date can reflect a lifetime of the chunk which comprises the data. As further examples, temporal data can be used to gauge when to reclaim disk space associated with a chunk based on a service agreement, available space in the data store, etc.

At 520, method 500 can determine if data chunks are to be sorted. In an aspect, where there are more than two chunks that are candidates for convolution, the candidate chunks can be sorted. Sorting can comprise ranking, ordering, filtering, etc., of the candidate chunks based on criterion that can comprise lifetime, customer agreements, data store parameters, etc. Where sorting is not indicated, selected, or determined at 520, method 500 can proceed to 530. At 530, method 500 can comprise generating a permission that facilitates convolving of the first data chunk and second data chunk to form a third data chunk. The generating at 530 can be in response to determining that a first temporal rule related to a level of similarity between the first temporal information and second temporal information has been satisfied. At this point method 500 can end.

However, where sorting is indicated, selected, or determined at 520, method 500 can proceed to 540. At 540, method 500 can comprise sorting N chunks, wherein the chunks comprise the first and second data chunks, based on corresponding N temporal data, wherein the N temporal data comprises the first temporal information and second temporal information, and wherein the N temporal data comprises an $L^{th}$ and $M^{th}$ temporal data corresponding to an $L^{th}$ and $M^{th}$ data chunk of the N data chunks. In an aspect the first temporal information can be the $L^{th}$ temporal data and the and second temporal information can be the $M^{th}$ temporal data. Sorting can group, rank, order, filter, etc., candidate chunks such that chunks with similar temporal features can be convolved.

At 550, method 500 can comprise, in response to determining that a second temporal rule related to a level of similarity between the $L^{th}$ temporal information and $M^{th}$ temporal information has been satisfied, generating a permission that facilitates convolving of the $L^{th}$ and $M^{th}$ data chunk into a subsequent data chunk. At this point method 500 can end. In some embodiments, additional chunks can be convolved based on the sort performed at 540 and the corresponding chunks satisfying the second rule. Method 500 therefore enables convolution of candidate chunks based on temporal features, and analysis thereof, of the candidate chunks. Moreover, the temporal rules of method 500 can be the same as, or similar to, those described elsewhere herein, e.g., allowing for convolution of chunks with similar lifetimes, affiliated with customer service agreements, based on available data store disk space, etc. Whereas chunks can be determine to not be available for convolution, method 500 can reduce copying of chunks that are not otherwise permitted to be convolved. Furthermore, where several candidate chunks are available, they can be sorted to convolve chunks that meet one or more temporal rules.

Figure 6:
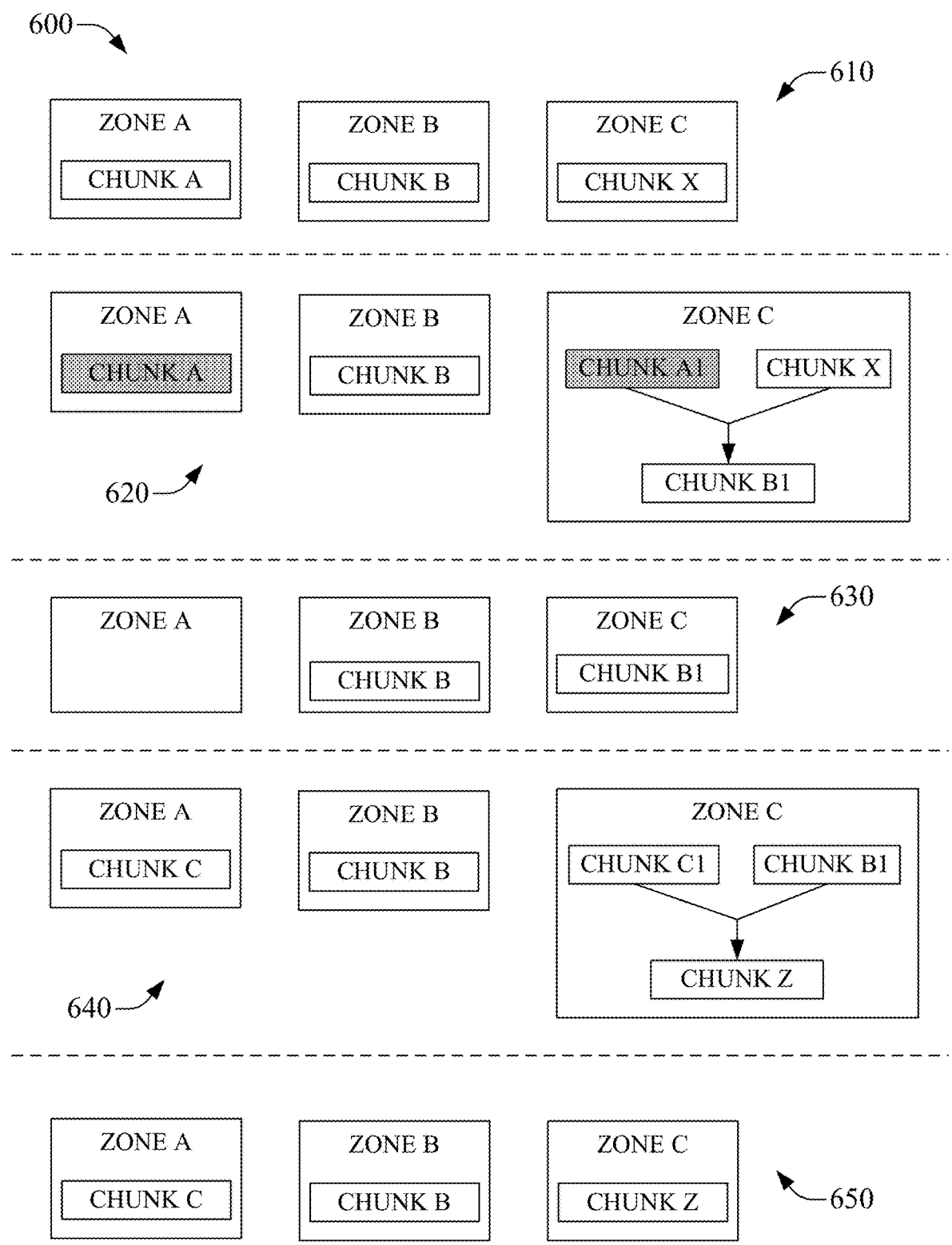
FIG. 6 is an illustration of example method states corresponding to de-convolving a convolved chunk and reclaiming the corresponding disk space for convolving another chunk based on temporal aspects of the convolved data, in accordance with aspects of the subject disclosure.

FIG. 6 is an illustration of example method states 600 corresponding to de-convolving a convolved chunk and reclaiming the corresponding disk space for convolving another chunk based on temporal aspects of the convolved data, in accordance with aspects of the subject disclosure. At 610, method 600 illustrates data store device states for a data store affiliated with each of zone A, zone B, and zone C. As is illustrated at 610, zone A can comprise chunk A, zone B can comprise chunk B, and zone C can comprise chunk X, wherein chunk X is a convolution of chunk A and chunk B. In an aspect, any copies of chunks A and B made at zone C to facilitate the convolution into chunk X can have been already deleted. As such, 610 can represent an ongoing state of the three zones. The state represented at 610 can, in a first aspect, continue until chunk A or chunk B becomes damaged, e.g., chunk X can then be de-convolved to recreate the damaged chunk A or B.

In a second aspect, the state represented at 610 can continue until the disk space occupied by chunk A is ready to be reclaimed. The space occupied by chunk A can be ready to be reclaimed where, for example, chunk A has become stale, disk space is being altered, etc. Where the disk space for chunk A is to be reclaimed, chunk A can be marked for removal as is indicated by the grey fill of chunk A in the states represented at 620. Temporal analysis of chunk A and B can be performed and it can be determined that chunk A can be removed and chunk B can persist. This can occur, for example, where the lifetime of chunk B is sufficiently different from chunk A that it is undesirable to persist chunk A until chunk B expires and also that it is undesirable to leave chunk B without a redundant copy where chunk A is removed. Other examples, such as, but not limited to, those disclosed elsewhere herein can also result in a similar de-convolution determination. In response, to determining that chunk A will be removed and chunk B will be persisted with redundancy, a replica of chunk A can be transferred over a network to zone C, and be created as chunk A1. Chunk A1 can then be used in conjunction with convolved chunk X to de-convolve chunk X into chunk B1, which can be a replica of chunk B, as is illustrated by the states at 620. Upon deletion of chunk A, the copy chunk A1 and the redundant convoluted chunk X, the states of the zones can be represented by 630. It will be noted that chunk B is mirrored by replica chunk B1, e.g., at a different geographical location to provide data redundancy. It will further be noted that the convolution of chunk A and chunk B, e.g., chunk X, is now removed. At this point method 600 can end.

Method 600 can also be continued where persisting chunk B of zone B can be again convolved with another chunk, such as, chunk C of zone A. At 640, new chunk C can be copied as chunk C1 into zone C. Chunk C1 can then be convolved with existing chunk B1 to form chunk Z. Upon removal of chunk C1 and chunk B1 as redundant with the data of newly formed chunk Z, the states of zones A, B, and C can be seen at 650. Similar to the states at 610, the states at 650 can persist in an ongoing state until chunk C or chunk B becomes damaged, until chunk C or chunk B reaches end of lifetime, etc.

Figure 7:
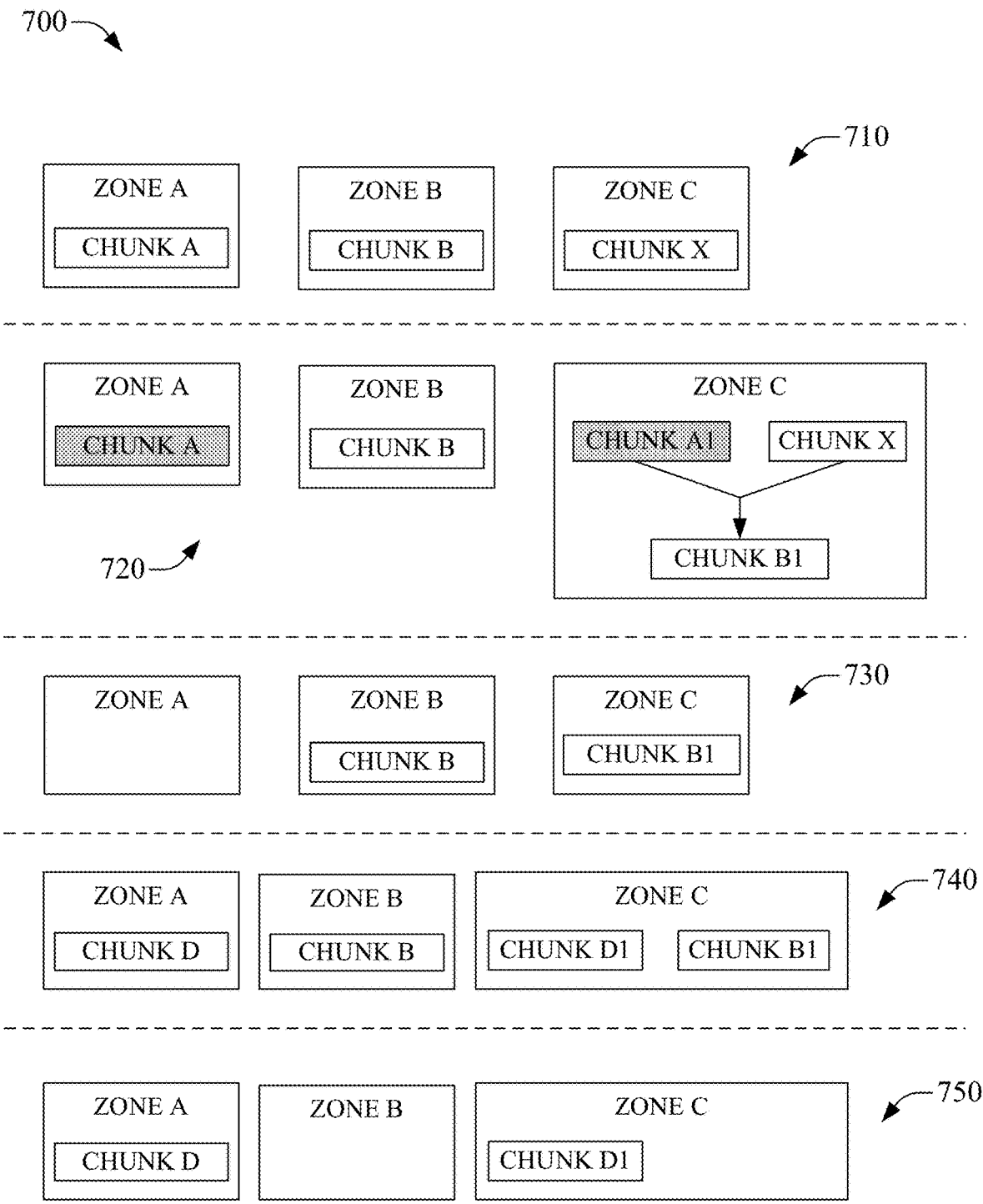
FIG. 7 illustrates example method states corresponding to de-convolving a convolved chunk and reclaiming the corresponding disk space without convolving another chunk based on temporal aspects of the convolved data, in accordance with aspects of the subject disclosure.

FIG. 7 illustrates example method states 700 corresponding to de-convolving a convolved chunk and reclaiming the corresponding disk space without convolving another chunk based on temporal aspects of the convolved data, in accordance with aspects of the subject disclosure. Method 700, at 710, can illustrate data store device states affiliated with each of zone A, zone B, and zone C. As is illustrated at 710, zone A can comprise chunk A, zone B can comprise chunk B, and zone C can comprise chunk X, wherein chunk X is a convolution of chunk A and chunk B. In an aspect, any copies of chunks A and B made at zone C to facilitate the convolution into chunk X can have been already deleted. As such, 710 can represent an ongoing state of the three zones.

The state represented at 710 can, in an aspect, continue until chunk A or chunk B becomes damaged, e.g., chunk X can then be de-convolved to recreate the damaged chunk A or B. In an alternative aspect, the state represented at 710 can continue until the disk space occupied by chunk A is ready to be reclaimed. The space occupied by chunk A can be ready to be reclaimed where, for example, chunk A has become stale, disk space is being altered, etc. Where the disk space for chunk A is to be reclaimed, chunk A can be marked for removal as is indicated by the grey fill of chunk A in the states represented at 720. Temporal analysis of chunk A and B can be performed and it can be determined that chunk A can be removed and chunk B can persist. This can occur, for example, where the lifetime of chunk B is sufficiently different from chunk A that it is undesirable to persist chunk A until chunk B expires and also that it is undesirable to leave chunk B without a redundant copy where chunk A is removed, etc.

In response, to determining that chunk A will be removed and chunk B will be persisted with redundancy, a replica of chunk A can be transferred over a network to zone C, and be created as chunk A1. Chunk A1 can then be used in conjunction with convolved chunk X to de-convolve chunk X into chunk B1, which can be a replica of chunk B, as is illustrated by the states at 720. Upon deletion of chunk A, the copy chunk A1 and the redundant convoluted chunk X, the states of the zones can be represented by 730. It will be noted that chunk B is mirrored by replica chunk B1, e.g., at a different geographical location to provide data redundancy. It will further be noted that the convolution of chunk A and chunk B, e.g., chunk X, is now removed. At this point method 700 can end.

Method 700 can also be continued where persisting chunk B of zone B can be subject to further temporal analysis. It can be determined that chunk B and chunk D have sufficiently different temporal aspects and they should not be convolved. At 740, new chunk D can be copied as chunk D1 into zone C. Chunk D1 can co-exist at zone C with chunk B1 and not be convolved. In an aspect, where the lifespan of chunk B and chunk D are sufficiently different, e.g., as determined by a first temporal rule related to similarity of temporal aspects, and the lifetime of chunk B is sufficiently short, e.g., as determined by a second temporal rule related to a remaining lifetime of a chunk, then it can be determined that persisting chunk D1 and chunk B1 as separate chunks can be preferred over convolving said chunks, as is illustrated at 740. Upon the subsequent expiration of chunk B, chunk B and chunk B1 can be deleted without copying over the network between zone B and zone C, as is illustrated at 750. It will be noted that a subsequent new chunk in zone B, not illustrated, can be convolved, wherein is determined to satisfy the temporal rule(s) in a manner similar to, or the same as is illustrated at 640 and 650 of FIG. 6.

Figure 8:
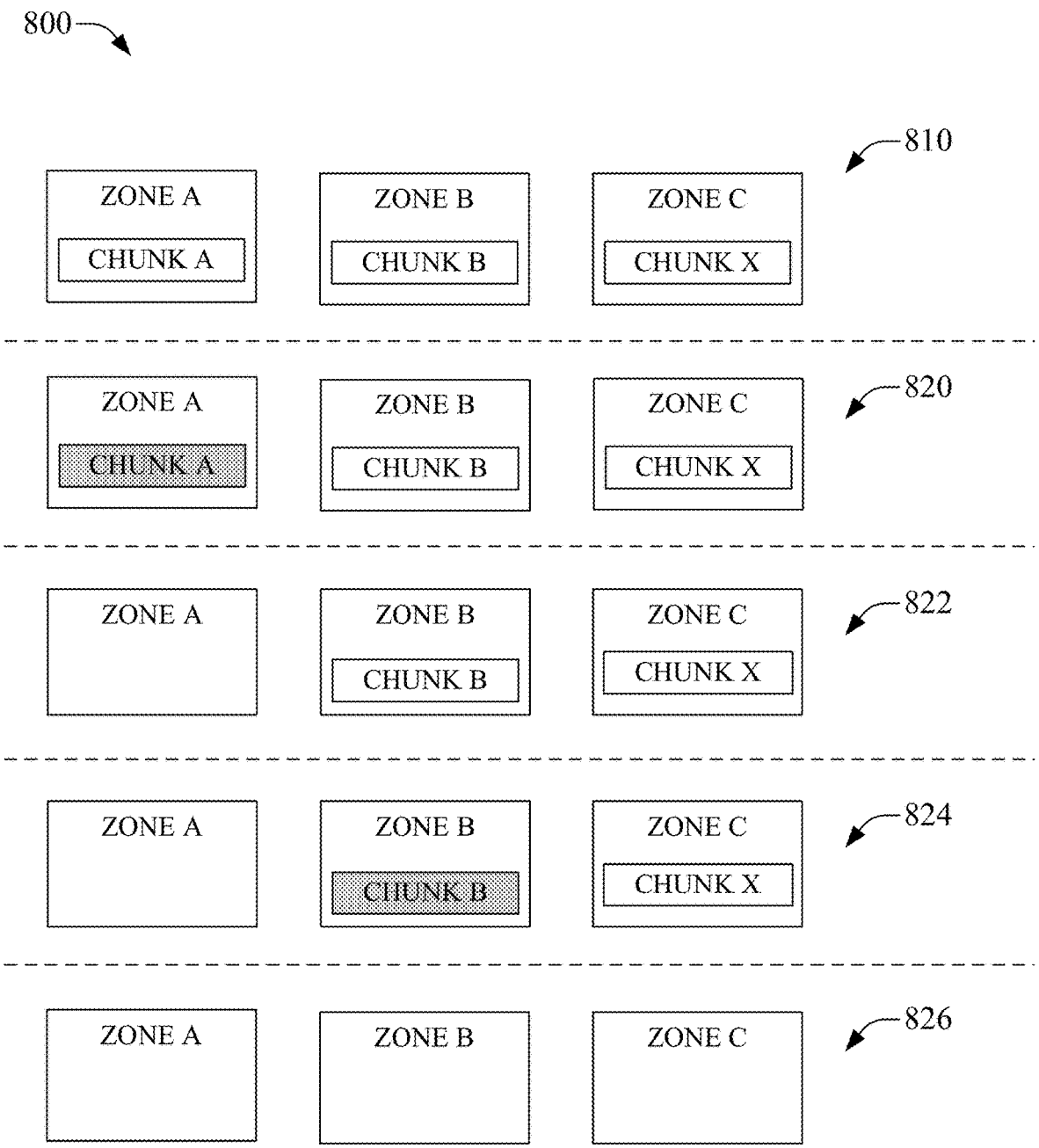
FIG. 8 illustrates example method states corresponding to reclaiming disk space without de-convolving a chunk based on temporal aspects of the convolved data, in accordance with aspects of the subject disclosure.

FIG. 8 illustrates example method states 800 corresponding to reclaiming disk space without de-convolving a chunk based on temporal aspects of the convolved data, in accordance with aspects of the subject disclosure. Method 800, at 810, can illustrate data store device states affiliated with each of zone A, zone B, and zone C. As is illustrated at 810, zone A can comprise chunk A, zone B can comprise chunk B, and zone C can comprise chunk X, wherein chunk X is a convolution of chunk A and chunk B. In an aspect, any copies of chunks A and B made at zone C to facilitate the convolution into chunk X can have been already deleted. As such, 810 can represent an ongoing state of the three zones.

The state represented at 810 can, in an aspect, continue until chunk A or chunk B becomes damaged, e.g., chunk X can then be de-convolved to recreate the damaged chunk A or B. In an alternative aspect, the state represented at 810 can continue until the disk space occupied by chunk A is ready to be reclaimed. The space occupied by chunk A can be ready to be reclaimed where, for example, chunk A has become stale, disk space is being altered, etc. Where the disk space for chunk A is to be reclaimed, chunk A can be marked for removal as is indicated by the grey fill of chunk A in the states represented at 820. Temporal analysis of chunk A and B can be performed and it can be determined that chunk A can be removed and chunk B can persist without redundancy. This can occur, for example, where the lifetime of chunk B is sufficiently different from chunk A that it is undesirable to persist chunk A until chunk B expires and also that it is determined to be an acceptable risk to leave chunk B without a redundant copy where chunk A is removed, etc. As an example, chunk B can have a lifetime that is perhaps just a day or two longer than chunk A and it can be determined that chunk B can exist without a replica for that short time period.

In response, to determining that chunk A will be removed and chunk B will be persisted without redundancy, a chunk A can simply be deleted without creating a replica chunk on zone C via transferring a copy of chunk A over a network to zone C. After chunk A is deleted from zone A, the state illustrated at 822 can be observed. Of note, where chunk A, for an unforeseen reason, needs to be recreated, chunk B can still be used with chunk X to recreate chunk A, however, if chunk B is damaged, chunk X cannot be used to recreate chunk B without chunk A data or a replica and, similarly, chunk a cannot be recreated with a damaged copy of chunk B.

At 824, chunk B can be subsequently marked for deletion. Where chunk B is ready to be deleted and chunk A has already been deleted at 822, chunk X is not needed further. As such, at 826, both chunk B and chunk X can be deleted. Of note, the deletions of chunk A, chunk B, and chunk C, in method 800 occur without transfer of copies of the chunks across the network based on the temporal analysis of the chunks, e.g., the chunks can have similar lifetimes with one chunk being slightly more long lived than the other, the risk of a chunk without a replica can be deemed acceptable, a customer agreement may permit chunk B to persist without a replica for up to a threshold time limit, etc. As such, method 800 provides for reduced data transfer based on the temporal analysis of the chunks.

Figure 9:
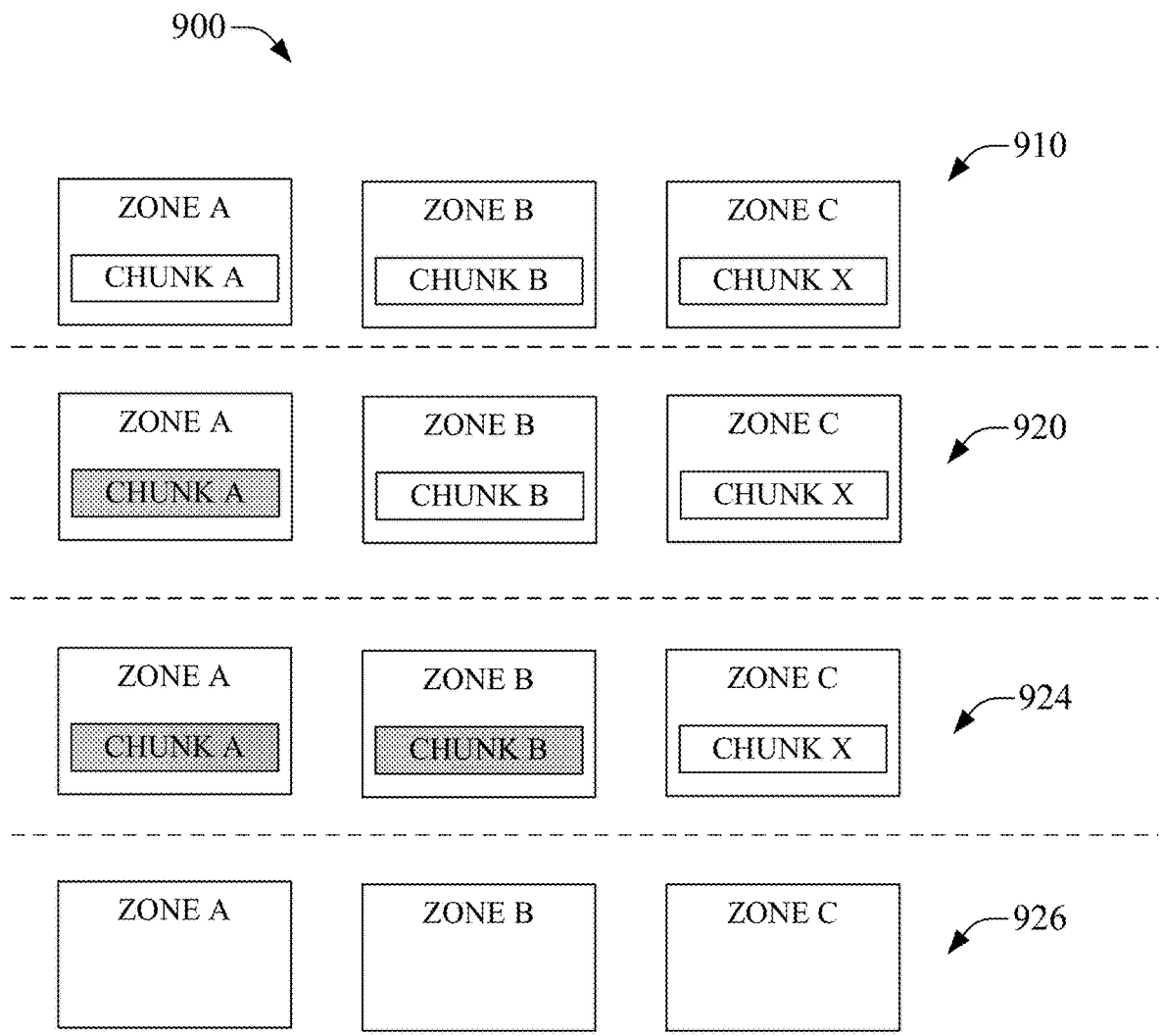
FIG. 9 illustrates alternative example method states corresponding to reclaiming disk space without de-convolving a chunk based on temporal aspects of the convolved data, in accordance with aspects of the subject disclosure.

FIG. 9 illustrates alternative example method states 900 corresponding to reclaiming disk space without de-convolving a chunk based on temporal aspects of the convolved data, in accordance with aspects of the subject disclosure. Method 900, at 910, can illustrate data store device states affiliated with each of zone A, zone B, and zone C. As is illustrated at 910, zone A can comprise chunk A, zone B can comprise chunk B, and zone C can comprise chunk X, wherein chunk X is a convolution of chunk A and chunk B. In an aspect, any copies of chunks A and B made at zone C to facilitate the convolution into chunk X can have been already deleted. As such, 910 can represent an ongoing state of the three zones.

The state represented at 910 can, in an aspect, continue until chunk A or chunk B becomes damaged, e.g., chunk X can then be de-convolved to recreate the damaged chunk A or B. In an alternative aspect, the state represented at 910 can continue until the disk space occupied by chunk A is ready to be reclaimed. The space occupied by chunk A can be ready to be reclaimed where, for example, chunk A has become stale, disk space is being altered, etc. Where the disk space for chunk A is to be reclaimed, chunk A can be marked for removal as is indicated by the grey fill of chunk A in the states represented at 920. Temporal analysis of chunk A and B can be performed and it can be determined that chunk A can be persisted and chunk B can be persisted. The persistence of both chunk A and chunk B enables de-convolution of chunk X where either chunk A or chunk B becomes damaged. It will be noted that chunk A can be persisted even where it is marked for deletion. This can occur, for example, where the lifetime of chunk B is sufficiently similar to chunk A that it is undesirable to remove chunk A until chunk B also expires, or that it is determined that it is not an acceptable risk to leave chunk B without a redundant copy and that the redundancy is best accomplished by persisting chunk A, just in case chunk X needs to be de-convolved. As an example, chunk B can have a lifetime that is perhaps just a day or two longer than chunk A and it can be determined that chunk B should be recoverable via chunks A and X for that short time period. Of note, an alternative is to copy chunk A to zone C, de-convolve chunk X into chunk B1, and then delete chunk A, A1, and X, e.g., in a manner similar to, or the same as, method 600.

In response, to determining that chunk A will be persisted, method 900 can enter the states illustrated in 920. At 924, chunk B can be marked for deletion upon, for example, expiration of the chunk B lifetime, etc. Where both chunk A and chunk B are now marked for deletion, the redundant data of chunk X is now extraneous and can also be removed. As such, at 926, chunks A, B, and X can be reclaimed without copying the chunks over the network between zones. Of note, temporal analysis chunk A, chunk B, and chunk C, e.g., the chunks can have similar lifetimes with one chunk being slightly more long lived than the other, the risk of a chunk without a replica can be deemed unacceptable, a customer agreement may permit chunk B to persist only with a replica, etc., enable deletion of said chunks without transfer of copies of the chunks across the network As such, method 900 provides for reduced data transfer based on the temporal analysis of the chunks.

Figure 10:
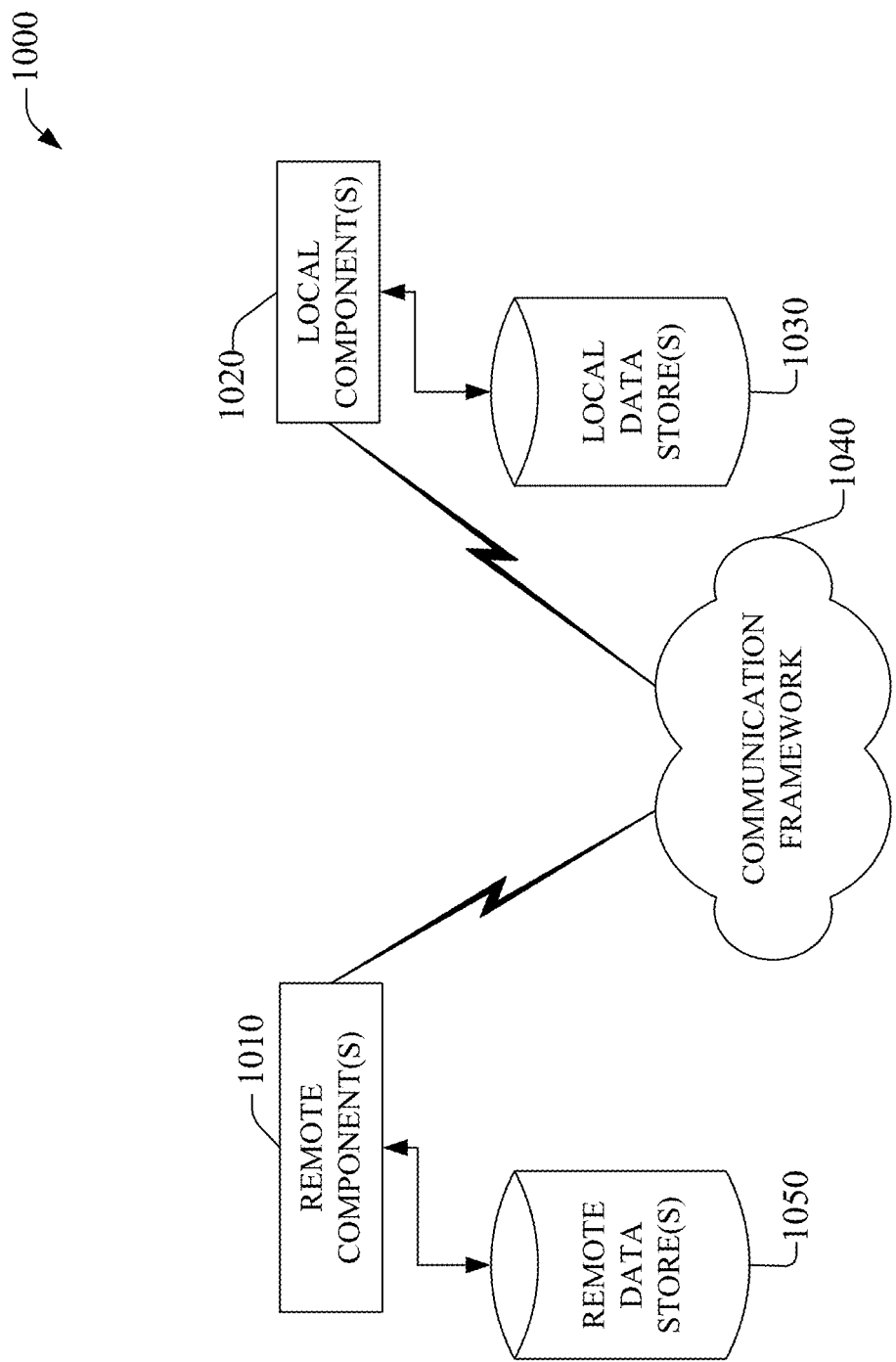
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be core-network devices associated with a network provider identity, e.g., data storage zone core components 230, 240, 250, 330, 340, 350, 430, 440, 450, etc.

The system 1000 also comprises one or more local component(s) 1020. The local component(s) 1020 can be hardware and/or software (e.g., threads, processes, computing devices). In some embodiments, local component(s) 1020 can comprise TAC 110, 210, 310, 410, etc.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040. As examples, temporal information corresponding to chunks stored on remotely located data store devices, e.g., data storage zone core components 230, 240, 250, 330, 340, 350, 430, 440, 450, etc., can be communicated via communication framework 1040 to TAC 110, 210, 310, 410, etc.

Figure 11:
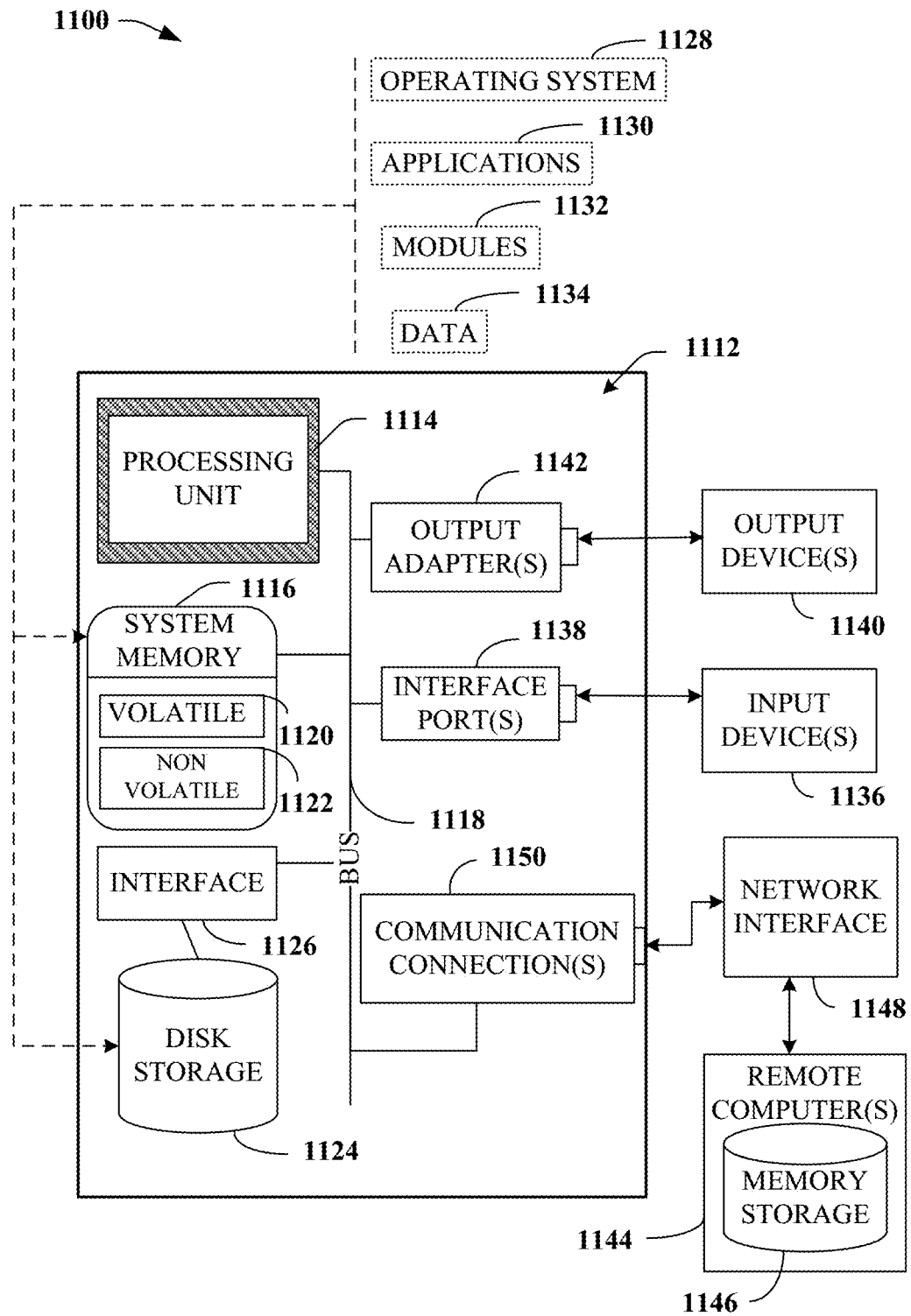
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, comprised in data storage zone core components 230, 240, 250, 330, 340, 350, 430, 440, 450, etc., TAC 110, 210, 310, 410, etc., can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by TAC 110, 210, 310, 410, etc., an temporal data corresponding to data chunks stored in storage device zones, e.g., data storage zone core components 230, 240, 250, 330, 340, 350, 430, 440, 450, etc., to determine if a rule related to a temporal condition has been satisfied.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a first time for a first data block, wherein the first time represents a first expected block lifetime of the first data block based on a first data relevancy lifetime;
determining a second time for a second data block, wherein the second time represents a second expected block lifetime of the second data block based on a second data relevancy lifetime;
in response to determining that the first time and second time satisfy a first rule based on a similarity of expected block lifetimes, facilitating formation of a third data block based on convolving at least the first data block and the second data block; and
in response to the first time and the second time being determined to satisfy a temporal condition, generating a modified third data block that does not convolve information of the first data block and releasing storage space associated with the third data block.

2. The system of claim 1, wherein the first data block is stored on a first memory at a first location, and wherein the second data block is stored on a second memory at a second location that is different from the first location.

3. The system of claim 2, wherein the third data block is stored on a third memory at a third location that is different from the first location and different from the second location.

4. The system of claim 1, wherein the third data block is formed by performing an 'exclusive or' operation first data of the first data block and second data of the second data block.

5. The system of claim 1, wherein, in response to determining that the first time satisfies a second rule based on a threshold expected block lifetime, deprioritizing the formation of the third data block based on the first data block and the second data block in regard to formation of a fourth data block based on a fifth data block and a sixth data block.

6. The system of claim 1, wherein the third data block is affiliated with a differential time based on the difference between the first time and the second time.

7. The system of claim 6, wherein, in response to determining that the differential time satisfies a third rule based on a threshold remaining block lifetime, deprioritizing a formation of a fourth data block based on the third data block in regard to formation of a fifth data block based on a sixth data block.

8. A system, comprising:
a processor; and
a memory that stores executable instructions that, when executed by the processor, facilitate performance of operations, comprising:
determining a first time for a first data block stored on a first data store at a first location, wherein the first time represents a first expected block lifetime reflecting a first period of data relevancy for first data of the first data block, and wherein the first expected block lifetime has expired;
determining a second time for a second data block stored on a second data store at a second location, wherein the second time represents a second expected block lifetime reflecting a second period of data relevancy for second data of the second data block; and
in response to determining that the first time and second time satisfy a first rule based on a similarity of expected block lifetimes, determining a release schema and enabling a release of memory space allocated to storing the first data block in accord with the release schema, wherein the release schema comprises instructions facilitating releasing memory space allocated to storing a convolved data block at a third data store at a third location subsequent to storing a modified convolved data block at the third data store, wherein the convolved data block convolved other data blocks with at least the first data block, and wherein the modified convolved data block convolves the other data blocks without the first data block.

9. The system of claim 8, wherein the operations further comprise:
writing a first data block duplicate at the third data store, wherein the third data store further comprises the third data block that is a convolution of the first data block and the second data block, wherein the third data block is the convolved data block; and
employing the first data block duplicate to de-convolve the third data block, resulting in a second data block duplicate being written to the third data store, wherein the second data block duplicate is the modified convolved data block; and
initiating the release of the memory space allocated to storing the first data block on the first data store, wherein the initiating the release of the memory space further comprises:
releasing a first memory space allocated to storing the first data block duplicate on the third data store, and
releasing a second memory space allocated to storing the third data block on the third data store.

10. The system of claim 9, wherein the operations further comprise:
in response to determining that a third time for a fourth data block stored on the first data store at the first location and the second time satisfy the first rule, facilitating formation of a fifth data block on the third data store, wherein the fifth data block is a convolution of a second data block duplicate of the second data block and a fourth data block duplicate of the fourth data block; and
releasing a third memory space allocated to storing the fourth data block duplicate and the second data block duplicate on the third data store.

11. The system of claim 8, wherein the operations further comprise:
writing a first data block duplicate at the third data store, wherein the third data store further comprises a third data block that is a convolution of the first data block and the second data block, wherein the third data block is the convolved data block; and
employing the first data block duplicate to de-convolve the third data block, resulting in a second data block duplicate being written to the third data store, wherein the second data block duplicate is the modified convolved data block;
initiating the release of the memory space allocated to storing the first data block on the first data store, wherein the initiating the release of the memory space further comprises:
releasing a first memory space allocated to storing the first data block duplicate on the third data store, and
releasing a second memory space allocated to storing the third data block on the third data store; and
in response to determining that a third time for a fourth data block stored on the first data store at the first location and the second time satisfy a second rule based on a remaining lifetime of a data block reflecting a third period of data relevancy for data of the data block, facilitating formation of a fourth data block duplicate of the fourth data block, wherein the fourth data block duplicate is written on the third data store.

12. The system of claim 11, wherein the operations further comprise:
in response to determining the second expected block lifetime of the second data block has expired:
releasing a third memory space allocated to storing the second data block on the second data store, and
releasing a fourth memory space allocated to storing the second data block duplicate on the third data store.

13. The system of claim 8, wherein the operations further comprise:
  initiating the release of the memory space allocated to storing the first data block on the first data store, and delaying releasing a first memory space allocated to storing a third data block on the third data store, wherein the third data block is a convolution of the first data block and the second data block.

14. The system of claim 13, wherein the operations further comprise:
  initiating the release of a second memory space allocated to storing the second data block on the second data store prior to initiating the release of the first memory space allocated to storing the third data block on the third data store.

15. The system of claim 8, wherein the operations further comprise:
  suspending the release of the memory space allocated to storing the first data block on the first data store, while the second expected block lifetime of the second data block has not expired; and
  in response to the second expected block lifetime of the second data block being determined to have expired:
    initiating the release of the memory space allocated to storing the first data block on the first data store,
    initiating the release of a first memory space allocated to storing the second data block on the second data store; and
    initiating the release of a second memory space allocated to storing a third data block on a third data store, wherein the third data block is the convolved data block.

16. A method, comprising:
  determining, by a system comprising a processor a first expected block lifetime for a first data block written to a first data store, wherein the first expected block lifetime corresponds to a first data lifetime of the first data;
  determining, by the system, a second expected block lifetime for a second data block written to a second data store, wherein the second expected block lifetime corresponds to a second data lifetime of the second data;
  in response to determining that the first expected block lifetime and second expected block lifetime satisfy a first rule based on a similarity of expected block lifetimes, facilitating formation of a third data block based on convolution of at least the first data block and the second data block, wherein the third data block is written to a third data store.

17. The method of claim 16, wherein the first data store, is different from the second data store, and wherein the third data store is different from either the first data store or the second data store.

18. The method of claim 16, wherein the formation of the third data block comprises performing an 'exclusive or' operation on first data of the first data block and second data of the second data block.

19. The method of claim 16, wherein, in response to determining that the first expected block lifetime has elapsed, determining a release schema comprising enabling a first release of first memory space allocated to storing the first data block in accord with the release schema and comprising enabling, in response to storing a modified third data block that does not convolve information of the first data block, a second release of second memory space allocated to storing the third data block.

20. The method of claim 19, wherein, in response to determining that the second expected block lifetime has elapsed, enabling a third release of third memory space allocated to storing the second data block in accord with the release schema.

* * * * *